United States Patent [19]

Kostylev et al.

[11] 4,181,484
[45] Jan. 1, 1980

[54] DEVICE FOR FORMING UNDERGROUND PIPELINES

[76] Inventors: Alexandr D. Kostylev, ulitsa Derzhavina, 19, kv. 44; Konstantin S. Gurkov, ulitsa Derzhavina, 19, kv. 13; Vladimir D. Plavskikh, ulitsa Gogolya, 233/1, kv. 34; Vladimir V. Klimashko, ulitsa Novogodnyaya, 44, kv. 24; Leonid G. Rozhkov, ulitsa Sovetskaya, 50, kv. 58; Vladimir A. Grigoraschenko, ulitsa Voskhod, 7, kv. 67; Vasily V. Filippov, ulitsa Severnaya, 23/2, kv. 8; Lazar M. Lipovetsky, ulitsa Stanislavskogo, 13, kv. 33; Valentin N. Ardyshev, ulitsa Khmelnitskogo, 18/3, kv. 1; Khaim B. Tkach, ulitsa Gogolya, 17, kv. 49, all of Novosibirsk, U.S.S.R.

[21] Appl. No.: 879,941

[22] Filed: Feb. 17, 1978

Related U.S. Application Data

[60] Division of Ser. No. 669,462, Mar. 22, 1976, Pat. No. 4,088,720, which is a continuation of Ser. No. 432,624, Jan. 11, 1974, abandoned.

[51] Int. Cl.² .............................................. B28B 21/42
[52] U.S. Cl. ....................................... 425/59; 425/95; 425/262; 425/290; 425/460
[58] Field of Search ................. 425/59, 262, 290, 460, 425/95; 264/31-33, 156; 405/115

[56] References Cited

U.S. PATENT DOCUMENTS

| 618,418 | 1/1899 | Keyes | 425/460 |
|---|---|---|---|
| 1,867,837 | 7/1932 | Jackson | 425/59 |
| 3,723,041 | 3/1973 | Brown | 425/460 |
| 3,886,242 | 5/1975 | McGregor | 425/63 |

FOREIGN PATENT DOCUMENTS 742140  9/1966  Canada ...................................... 425/59

*Primary Examiner*—John McQuade
*Attorney, Agent, or Firm*—Haseltine, Lake & Waters

[57] ABSTRACT

Apparatus for building underground pipelines by forming a casing in a hole from a forming material which is compacted in the direction from the center of the hole towards its walls. The hole is first filled with the forming material throughout its cross-sectional area and then the material is compacted in the direction towards the walls of the hole. Compaction is effected by a device comprising a rod-shaped body adapted for moving through the hole, the front end of the body being provided with a system of radial ribs.

7 Claims, 10 Drawing Figures

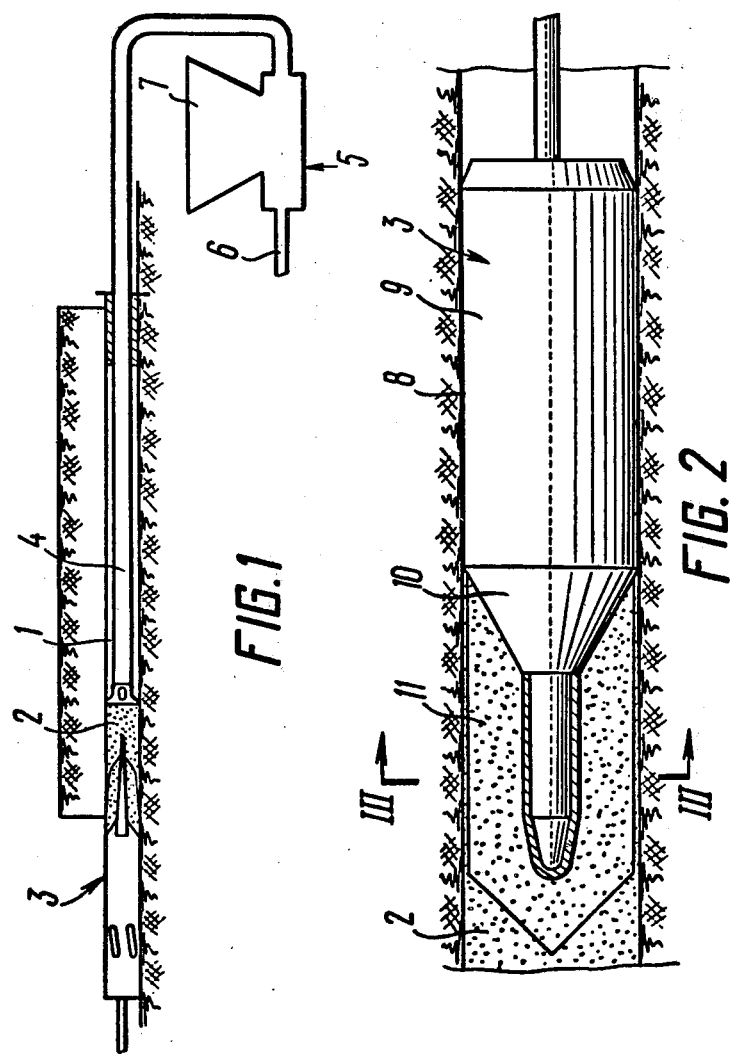

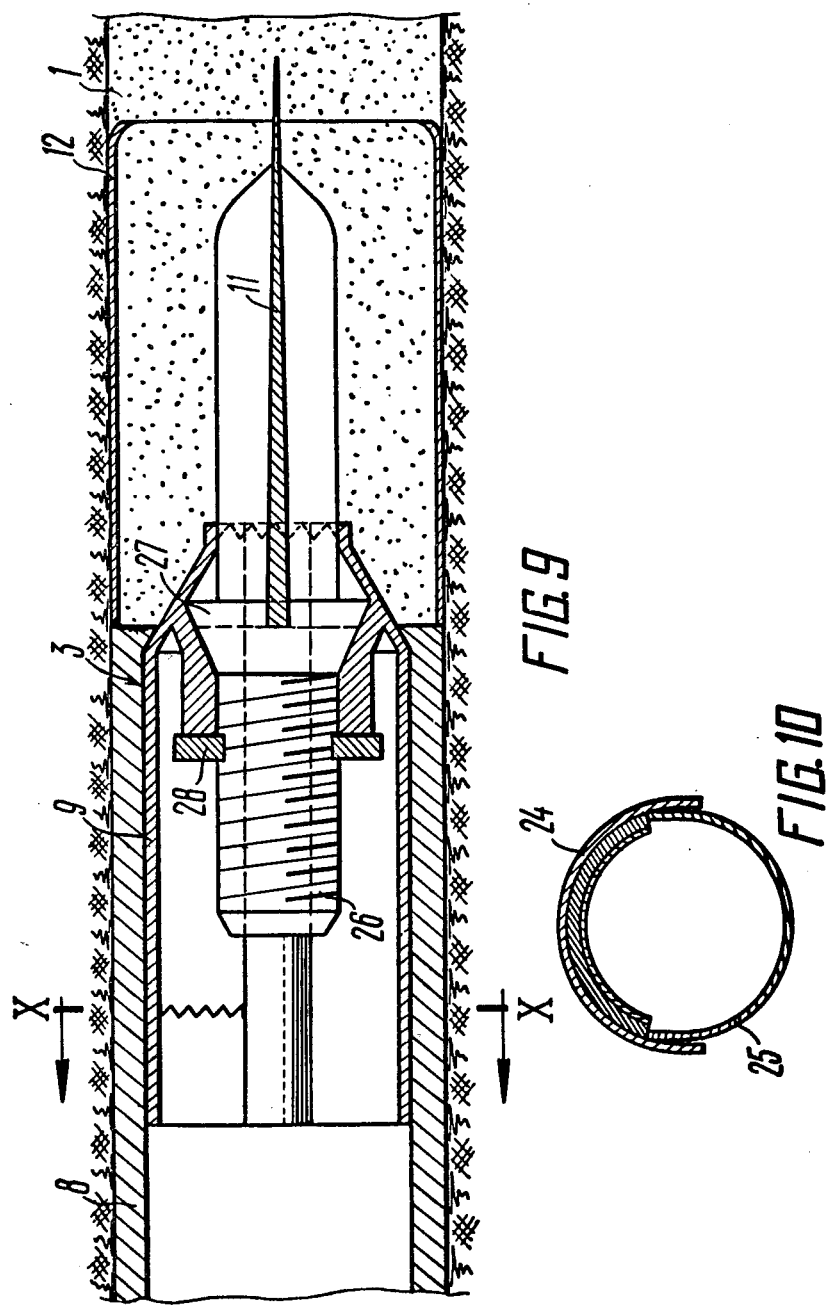

DEVICE FOR FORMING UNDERGROUND PIPELINES

CROSS-RELATED APPLICATION

This application is a division of Ser. No. 669,462 filed Mar. 22, 1976 and issued as U.S. Pat. No. 4,088,720 which in turn is a continuation of Ser. No. 432,624 filed Jan. 11, 1974 and now abandoned.

FIELD OF THE INVENTION

The present invention relates to apparatus for forming casings inside holes intended for use in underground pipelines.

BACKGROUND

At present, underground pipelines are commonly built by laying ready-made pipes inside holes. Each pipe is placed into the hole by pulling it therein with a winch.

The basic disadvantage of this method lies is that it often cannot be employed under the cramped city conditions where an areaway (pit) must be made at the hole inlet, the dimensions of this areaway corresponding to the length of the pipe to be laid into the hole.

Besides, excavation of areaways involves extra expenditures.

Another disadvantage of this method lies in the complexity of joining the pipes inside the hole, all the more so when these holes have a considerable length.

Still another disadvantage of this method is the process of pulling pipes into holes whose length exceeds 20 m which becomes considerably more difficult and necessitates making holes with a diameter substantially larger than that of the pipe; this likewise involves additional expenditures. Besides, this method cannot be used with holes having curved portions.

Another, not less known method of forming casings in holes consists in making these casings in the course of hole driving. In this case the casing is made by the same device which is used for driving the hole. The casing is formed by the tail portion of the device body for which purpose the tail portion of said device is provided with channels for the delivery of the forming material, i.e., mortar, into the gap between the body of the device and the walls of the hole (see, for example, U.S. Pat. No. 2,680,416, Cl.61-72.2, USA).

The main disadvantage of this method resides in the difficulties involved in ensuring the differential supply of the forming material to suit the hole driving speed which varies with the changing properties of the soil. As a result, the casing of the hole becomes nonuniform in density along the length of the hole, and has pits so that the casing walls differ in strength, permeability to moisture, etc.

SUMMARY OF THE INVENTION

An object of the invention resides in eliminating the disadvantages of the above-quoted methods.

The main object of the invention resides in providing a device for improving the formation of casings from forming materials by compacting the latter so as to make the casings highly homogeneous with respect to strength and density.

Other objects of the invention are to improve the economy of the process of making pipelines, to adapt the process for use in city conditions, particularly in conjested areas, in holes with curved sections, etc.

This object is achieved by providing a device which carries out a process of forming casings in holes consisting in that the hole is filled with a self-setting forming material which is compacted in the direction of the hole walls by a rod-shaped body moving through said hole wherein, according to the invention, the hole is filled throughout its cross-section with the forming material delivered into the hole by a stream of a gaseous medium.

To speed up the process it is preferred that the forming material be delivered into the hole in the direction opposite to that of the process of compaction.

It is also preferrable that a moist gaseous medium be delivered to the forming material in the process of its compaction.

The device for forming a casing in a hole comprises a rod-shaped body adapted for moving through the hole and provided in front with a system of radial ribs.

For aligning the device in the hole at the initial stage of operation, when the major part of its body is outside of the hole, the front end of the body is provided with a removable ring which fits around said system of radial ribs, the outside diameter of said ring being actually equal to the diameter of the hole.

To ensure the supply of moisture to the forming material being compacted, the hollow body of the device has a chamber with openings located in the body walls facing the walls of the hole, and channels for the delivery of the gaseous medium into, and discharging said medium from, said chamber.

In order to be able to perforate the casing in the process of its forming, it is preferred that a power cylinder be installed inside the body of the device and that the piston of said cylinder have at least one longitudinal inclined slot receiving one end of a pin installed in the body of the device with provision for movement in a radial direction.

In order to be able to form casings of various thickness, it is preferred that the body of the device be split longitudinally and its sections be installed with provision for being moved in two mutually perpendicular directions along a longitudinal guide with which said body sections are in contact over the tapered surface which ensures radial movement of said body sections.

BRIEF DESCRIPTION OF THE DRAWING

Now the invention will be described in detail by way of example with reference to the accompanying drawings, in which:

FIG. 1 is a longitudinal section of the hole in the process of forming the casing by the method according to the invention with the aid of the illustrated device;

FIG. 2 shows a modification of the device wherein the front end of the body is provided with radial ribs;

FIG. 3 is a section taken along line III—III in FIG. 2;

FIG. 9 shows still another embodiment of the device wherein the body is made up of longitudinally split sections; and FIG. 10 is a section taken along line X—X in FIG. 9.

DETAILED DESCRIPTION

Figure 4:
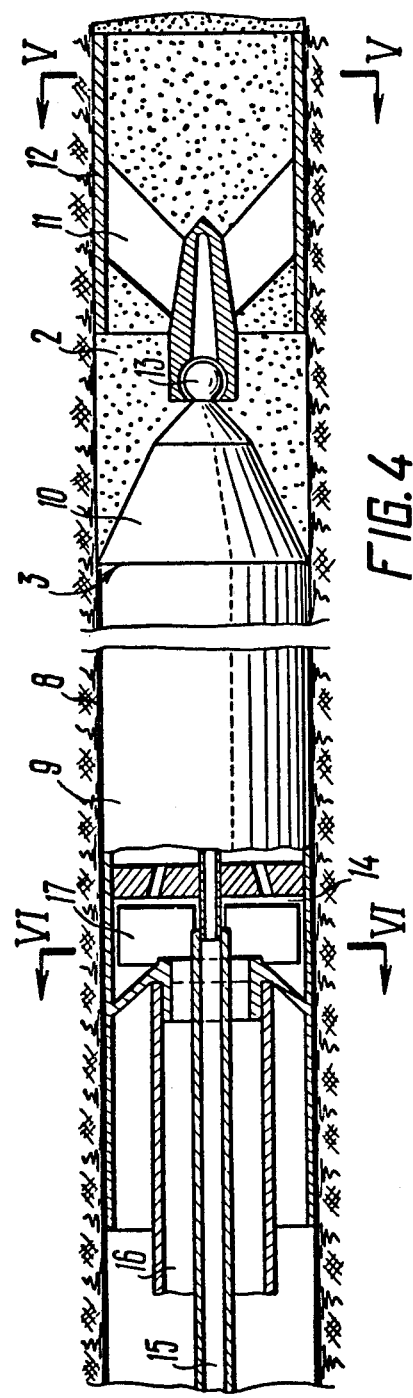
FIG. 4 shows another embodiment of the same device wherein the front end of the body is provided with a ring fitting around the radial ribs and wherein the tail portion of the body houses a chamber and channels for the delivery of moist gaseous medium to the forming material in the process of its compaction.
Figure 5:
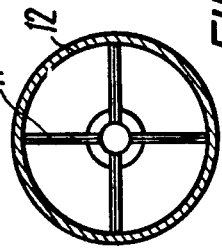
FIG. 5 is a section taken along line V—V in FIG. 4.

According to the invention a finished hole 1 (FIGS. 1, 3 and 9) is filled, by a gas stream, with a forming material 2 (FIGS. 1, 2, 4, 7) constituted by cement-sand, asbestos-cement or other similar self-setting mortars. The hole is filled with the forming material throughout its entire cross-section. The forming material can be delivered into the hole either before the process of forming the casing or concurrently with it. In the latter case the forming material is delivered continuously by a counterflow in the course of movement of the device 3 (FIGS. 1, 2, 4, 7, 9) which compacts the forming material.

The forming material is delivered into the hole through a hose 4 (FIG. 1) with the aid of a pressure-delivery device 5 which is connected by a pipe 6 with a source of compressed gas (not shown in the drawing). The pressure-delivery device 5 is loaded with the forming material 2 through a hopper 7.

To improve the conditions for setting of the formed casing, an additional amount of moisture can be introduced together with the flow of the moist gaseous medium delivered to the surface of the formed casing. The casing is made by compacting the forming material in a radial direction by a device moving through the hole, the shape of the body of said device corresponding to the desired profile of the casing.

Figure 7:
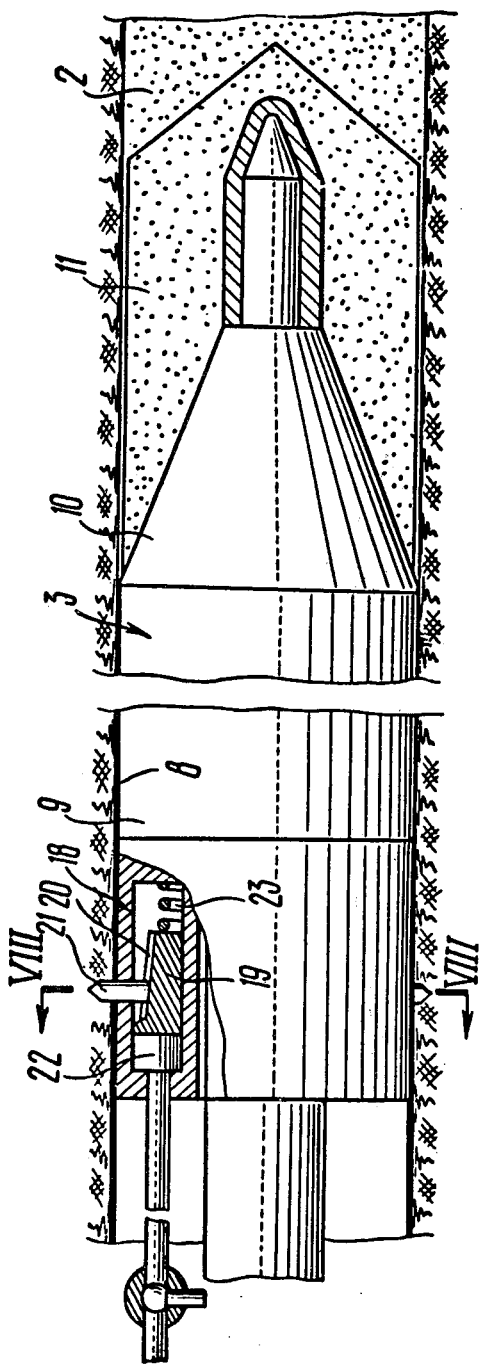
FIG. 7 shows still another embodiment of the same device wherein the tail portion of the body accommodates a device for perforating the casing.
Figure 8:
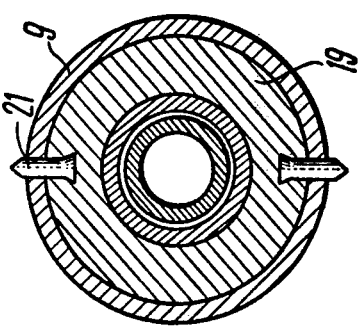
FIG. 8 is a section taken along line VIII—VIII in FIG. 7.

The device for forming the casing 8 (FIGS. 2, 4, 7, 9) comprises a rod-shaped body 9 (FIGS. 2, 4, 7, 8 and 9) whose front end 10 ends in a cone (FIGS. 2, 4, 7).

The front part of the body 9 is provided with a system of radial ribs 11 (FIGS. 2, 3, 4, 5, 7 and 9) intended for uniform distribution of the forming material over the cross-sectional area of the hole which assists in attaining uniform density and thickness of the casing walls.

Additionally, the front part of the body has a ring 12 installed around the ribs 11 and secured to the latter. The diameter of the ring 12 is substantially equal to that of the hole. The ring 12 (FIGS. 4, 5, 9) is intended to align the device with the axis of the hole at the initial stage of operation of the device when the major part of the latter is still outside the hole. The device is aligned due to the fact that the diameter of the ring is equal to that of the hole.

To make it possible to replace the ring 12 to suit a different diameter of the hole, said ring can be detached from the body 9 together with a part of the body and ribs 11.

To protect the device against breaking in curved sections of the hole, it is preferred that the part of the body carrying the ribs 11 and the ring 12 be connected with the main part of the body 9 by a ball joint 13 (FIG. 4).

Figure 6:
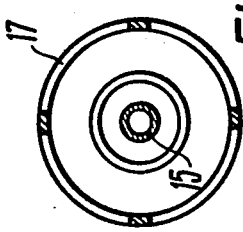
FIG. 6 is a section taken along line VI—VI in FIG. 4.

The body 9 of the device can be made hollow. In this case it can accommodate a device for additional moistening of the formed casing. This device comprises a chamber 14 and a system of channels of which channel 15 (FIGS. 4 and 6) delivers moistened compressed gas into the chamber 14 and channel 16 discharges the used gaseous medium.

The walls of the body 9 around the chamber 14 are provided with openings 17 (FIGS. 4 and 6) which admit the moist gaseous medium to the formed casing 8. The channel 15 is in communication with a source of compressed air.

The space in the tail portion of the body 9 can accommodate a device for perforating the casing concurrently with its forming during a single run of the device.

The perforating device comprises a power cylinder 18 (FIG. 7) formed by the walls of the body 9. The piston 19 (FIGS. 7 and 8) of the power cylinder 18 has longitudinal slots 20 (FIG. 7). The walls of the body 9 which form the power cylinder have radial through holes accommodating pins 21 (FIGS. 7 and 8) installed with a provision for longitudinal movement.

The holes accommodating the pins 21 coincide with slots 20 in the piston 19. The pins 21 are installed in the holes so that one end of said pins enters into the corresponding slots 20. As the piston moves back and forth, the pins 21 slide in the corresponding inclined slots 20; as a result, the pins 21 are periodically extended from, or retracted into, the body 9 of the device. When the pins are extended from the body 9, they pierce the casing 8, thus perforating it.

The working stroke of the piston 19 takes place when pressure is delivered into the space 22 (FIG. 7) of the power cylinder 18; then the piston is returned to the initial position by a spring 23.

To form casings of different thicknesses, the body 9 of the device can be split longitudinally.

The individual sections 24 and 25 (FIG. 10) of the body are installed on a longitudinal guide 26 (FIG. 9) and are in contact with said guide over the conical surface 27. The split sections 24 and 25 can be shifted along the guide 26 by a nut 28 (FIG. 9) which is mounted on the guide 26, said guide being held against longitudinal displacement whereas the nut 28 can move longitudinally along the threads rotated by hand. Due to the fact that the sections of the body contact the guide 26 over the conical surface 27, their longitudinal movement is combined with their radial movement which changes the diameter of the forming body and, correspondingly, the thickness of the produced casing.

The above-described embodiment of the device is self-propelled. It is driven by a commonly known impact mechanism which therefore, is not described in the description. For transmission of energy to the impact mechanism it is preferred that the piston 19 be made circular as it is shown in FIG. 7.

The operation of the device according to the invention does not depend on the type of drive and on whether it moves by itself or with the aid of other transport means installed on the ground surface. These means should not be regarded as novel since they are widely known in devices employed simultaneously for driving holes and forming hole casings. In view of the above, also because we consider the self-contained drive more rational, we do not submit here a description of other means for moving the device according to the invention.

We claim:

1. A device for forming a casing in holes in the ground, said device comprising a rod-shaped body adapted for moving through a hole and a system of radial ribs installed on the front end of said body for uniform distribution of mortar material in the hole over the cross-sectional area of the hole, a power cylinder in said body including a piston having at least one longitudinal inclined slot, and at least one pin installed in said body with provision for radial movement to extend radially from said body and perforate the wall of the casing being formed, said pin having one end received in said slot for being radially moved upon displacement of said piston.

2. A device according to claim 1 comprising a detachable ring fitting around said system of radial ribs, the outside diameter of the ring being substantially equal to the diameter of the hole.

3. A device according to claim 1 wherein said body is hollow and defines a chamber with openings located in the walls of the body facing the walls of the hole, said body having channels for the delivery of gaseous medium into, and for discharging it from, the chamber.

4. Apparatus for forming a casing in horizontal holes completely immersed in the ground and having annular cross-sectional profiles, said apparatus comprising means for filling the hole through its entire cross-section with a self-setting wetted material for forming a casing including means for delivering said material into the hole under the action of a stream of a gaseous medium under pressure, means for compacting the material in the hole in the radial direction of the walls thereof including a hollow rod-shaped body advanceable through said hole, said rod-shaped body having a front end with compaction means at said front end for compacting the wetted material, said rod-shaped body having opening means disposed rearwards of said compaction means open radially into the hole, and means for discharging a moistened compressed gas into said body and through said opening means for discharge radially from said body against the casing being formed.

5. Apparatus as claimed in claim 4 wherein the forming material is delivered in a direction opposite the travel of the rod-shaped body.

6. Apparatus as claimed in claim 4 comprising punch means on said body for perforating the casing radially as said body is advanced through the casing in the course of its formation.

7. A device for forming a casing in holes in the ground, said device comprising a rod-shaped body adapted for moving through a hole and a system of radial ribs installed on the front end of said body for uniform distribution of mortar material in the hole over the cross-sectional area of the hole, said body being split longitudinally into sections which are installed with a provision for being moved in two mutually opposite directions along a longitudinal guide with which said sections are in contact over a conical surface, to ensure radial movement of said body sections.

* * * * *